July 21, 1925.  1,546,708
J. S. BOOTH
MOTOR VEHICLE
Filed June 29, 1922  2 Sheets-Sheet 1
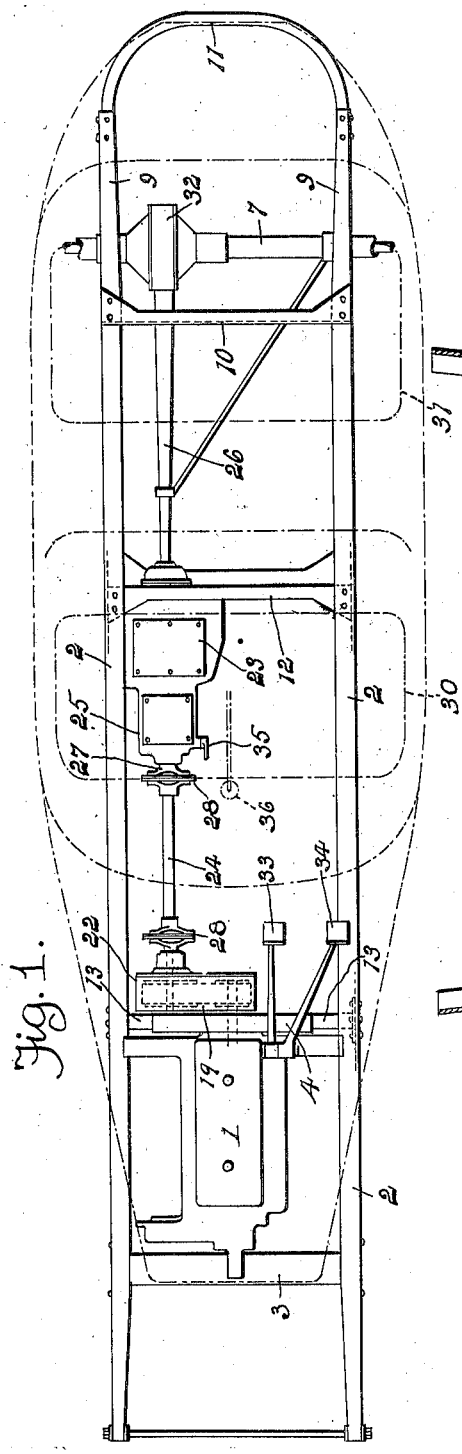
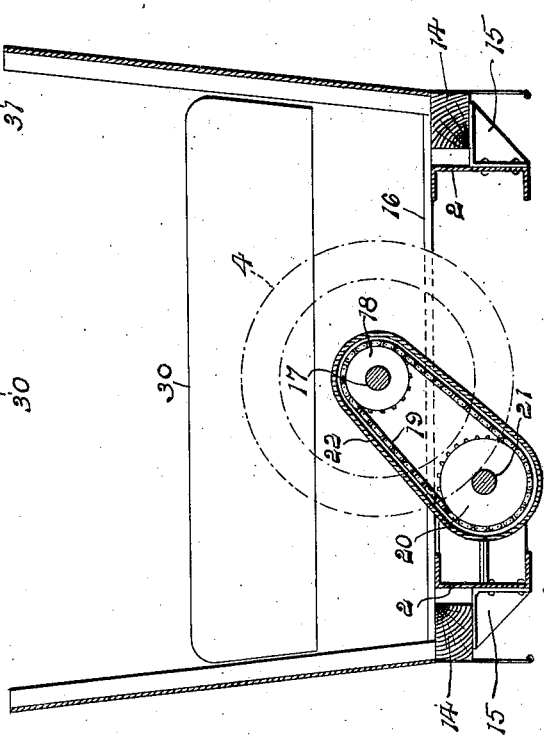
Inventor
James Scripps Booth,
By
Attorneys

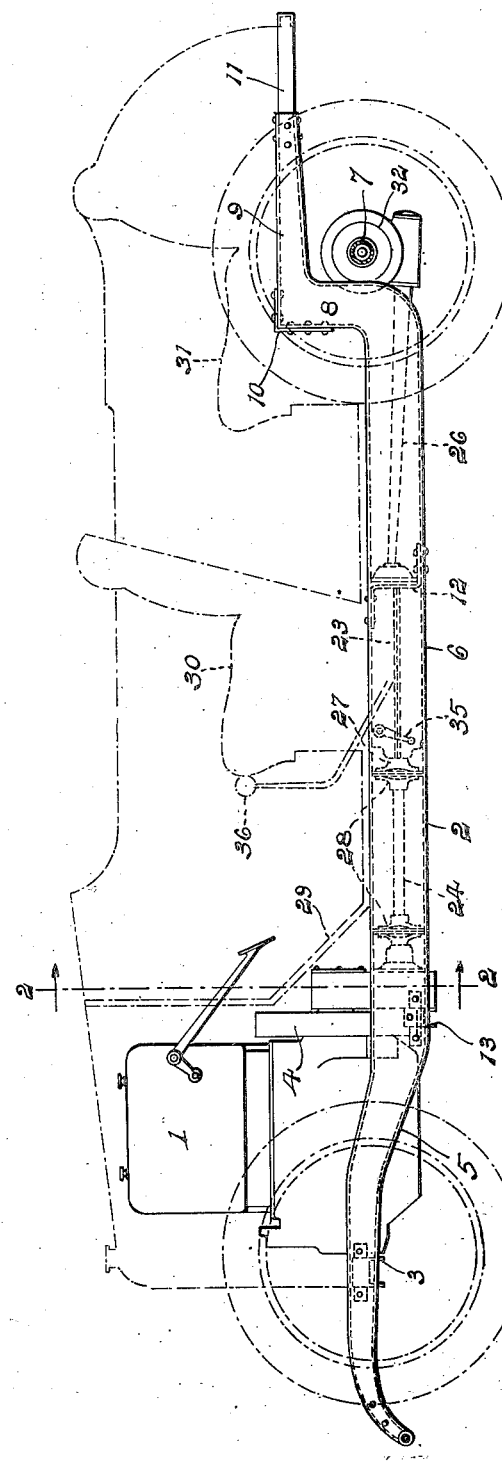

Patented July 21, 1925.

1,546,708

UNITED STATES PATENT OFFICE.

JAMES S. BOOTH, OF PASADENA, CALIFORNIA.

MOTOR VEHICLE.

Application filed June 29, 1922. Serial No. 571,613.

REISSUED

To all whom it may concern:

Be it known that I, JAMES SCRIPPS BOOTH, a citizen of the United States of America, residing at Pasadena, in the county of Los Angeles and State of California, have invented certain new and useful Improvements in Motor Vehicles, of which the following is a specification, reference being had therein to the accompanying drawings.

In motor vehicle construction it is desirable that the load be carried as low as possible to prevent side sway of the vehicle, and to provide easy access to the body. It is also desirable that the seating arrangement of a four or five passenger double seat body be such as to carry the passenger load mainly between the front and rear axles to give easy riding qualities and such as to provide ample leg room and height of seats without the necessity for lengthening the wheel base unduly or increasing the seating height above the normal. A further desideratum in light passenger automobiles is to effect a low rangy appearance with a comparatively short wheel base whereby low cost of manufacture is maintained and a construction is secured having the quality of holding the road, which quality is inherent in larger cars of more expensive design.

The object of the present invention is to provide a construction and arrangement whereby all of the above enumerated desirable features are secured in a light passenger automobile, together with other new and useful features, all as hereinafter more fully set forth, the invention consisting in an arrangement of the power plant and power transmitting mechanism, whereby the overall length of the power plant is shortened to gain body room between the axles, the means for transmitting power to the rear axle is lowered relative to the power plant and is brought within the plane of the side members of the frame, and a drop in said frame members between the axles is permitted to give a low construction.

The invention further consists in other matters and in the construction and arrangement of parts, all as hereinafter more fully described and particularly pointed out in the appended claims, reference being had to the accompanying drawings in which Figure 1 is a plan view of an automobile chassis embodying features of the invention;

Fig. 2 is an enlarged transverse vertical section of the chassis and a body thereon, substantially upon the line 2—2 of Fig. 3; and Fig. 3 is a side elevation of the chassis, showing an outline of the body in dotted lines.

Passenger automobiles as commonly constructed have a power plant which is located adjacent the forward end of the chassis frame and just rearwardly of the front axle. Motion is transmitted to the rear axle through the clutch and change-speed gearing which are usually positioned adjacent the rear end of the power plant or engine, and through a propeller shaft extending from the rear end of the transmission casing to the rear axle. This arrangement necessitates the substantial alignment of the propeller shaft, transmission mechanism, clutch, and engine crank shaft so that the front end of the propeller shaft is supported within the horizontal plane of the engine crank shaft, thereby positioning the propeller shaft at a considerable elevation above the ground, also necessitating the placing of the floor of the body at a considerable height from the ground. Further, the locating of the transmission mechanism within a casing which forms a continuation of the engine crank case, as is the usual practice, and the locating of the clutch and flywheel between the transmission mechanism and the engine, materially increases the overall length of the power plant and takes up considerable room which would otherwise be available as leg room within the body. Further, the arrangement commonly employed in the construction of the cheaper class of light passenger vehicles, prohibits the dropping of the side members of the chassis frame between the axles in order to secure a low down construction as in order to lower the floor of the body it is necessary to lower the mechanism for transmitting motion from the power plant to the rear axle, to a plane below the plane of the floor.

In the construction illustrated in the accompanying drawings, 1 indicates an engine of any suitable type, which engine is supported in any suitable manner between the side members 2 of a chassis frame adjacent the forward cross member 3 of the frame and adjacent the front axle (not shown), said engine being provided with a fly wheel 4 arranged in the usual manner adjacent the rear end of the engine crank case. Rearwardly of the cross member 3, the side members 2 of the chassis frame are bent downwardly as at 5 to bring the intermediate portion 6 of these members to a relatively low level between the front axle 3 and the rear axle 7, said frame members being formed just forwardly of the rear axle with an abrupt upward bend providing a substantially straight vertical portion 8 which is integral at its upper end with a tapering rear end portion 9 extending horizontally of and in rearward direction over the rear axle and at a sufficient distance above the same to provide for relative movement of the axle and frame due to flexure of the spring suspension (not shown).

The side members 2 are tied together adjacent their rear ends by a cross member 10 of angle construction which is riveted or otherwise secured to the substantially right angle shoulder formed at the upper end of the vertical portion 8 of each member. The side members are further tied together at their extreme rear ends by a light channel member 11 bent into curved or U-form and riveted to the ends of the side members, said extension 11 forming a support for the extreme rear end of the body. An intermediate cross member 12 ties the side members 2 together intermediate the cross member 13 which forms a support at the rear end of the engine and the cross member 10 which is located just forwardly of the rear axle. The drop in the side members 2 provided by the intermediate portion 6, forms a support for the body, the body sills 14 resting upon brackets 15, as shown in Fig. 2, secured to the outer sides of the frame members with the upper faces of the sills in the plane of the upper faces of the frame members. The drop or intermediate portions 6 of the chassis frame members are of extended vertical width in cross section to give added strength and rigidity to the chassis frame and in order that the body floor 16 may not interfere with the mechanism for transmitting motion from the power plant to the rear axle, such mechanism is supported between the drop portions 6 of the frame members within the horizontal plane of said portions.

To transmit motion from the rear end of the engine crank shaft 17, shown in Fig. 2, and upon which rear end portion the fly wheel 4 is secured, to a point distant and below the horizontal plane of said crank shaft, a sprocket wheel 18 is secured upon the end of the crank shaft adjacent the rear side of the fly wheel to be engaged by a suitable chain 19 which passes over a similar sprocket 20 secured upon a shaft 21 which is mounted in suitable bearings within a casing 22 enclosing said chain and sprockets and extending downwardly and laterally from the crank shaft toward one side of the chassis frame and within said frame, said shaft 21 being positioned approximately within the central horizontal plane of the intermediate portions 6 of the frame members 2. Motion is therefore transmitted directly from the rear end of the engine crank shaft laterally and downwardly to a plane below the plane of the floor 16, of the body so that change speed gearing (not shown) which is enclosed within a casing 23, the intermediate power shaft 24 for transmitting motion from the rear end of the shaft 21, suitable clutch mechanism (not shown) which is enclosed within a forward extension 25 of the casing 23, and the propeller shaft 26, may all be located within a horizontal plane of the intermediate portions 6 of the frame members 2. To provide for inaccuracies in alignment of the shaft 21 with the main shaft 27 of the transmission mechanism upon which the clutch mechanism (not shown) is secured within the casing 25, universal joint connections 28 are provided between the shaft 21 and the forward end of the shaft 24 and also between the rear end of the shaft 24 and the forward end of the shaft 27. By locating the clutch and transmission mechanism at a distance from the rear end of the engine crank shaft and below the horizontal plane of said shaft and within the plane of the chassis frame below the plane of the floor of the body, a very material gain in room within the body is secured as the toe board indicated at 29 in Fig. 3 may be located very close to the rear end of the engine, thus providing ample leg room within the body forwardly of the front seat, which seat is indicated in dotted lines at 30 in Fig. 3. This arrangement also permits of setting the seat 30 well forward within the body so that ample leg room will be provided between it and the rear seat 31, also indicated in dotted lines in Fig. 3, and this rear seat may be located over and partly forwardly of the vertical portions 8 of the chassis frame members. Both front and rear seats are therefore located between the vertical planes of the front and rear axles and the passenger load will therefore be carried between the axles, providing the ideal arrangement in a two-seated light vehicle of comparatively short wheel base, to give easy riding qualities.

As the intermediate portions 6 of the chassis frame members extend in a horizontal plane below the horizontal plane of the rear axle, and as the floor boards of the rear portion of the body rest directly upon the upper edges of these portions of the frame members, the rear end of the propeller shaft 26 is preferably connected with the lower side of the differential gearing 32 of the rear axle, to permit of free relative movement between the body and propeller shaft upon flexure of the body supporting springs (not shown). The usual brake pedal 33 and clutch pedal 34 are provided, the same being mounted in any convenient manner and provided with the usual connections (not shown) for operating the brakes (not shown) and the clutch mechanism which is located adjacent the forward end of the change speed mechanism, said clutch mechanism being provided with an operating arm 35 located outside the casing 25, and the usual shift lever which is indicated in dotted lines at 36 is provided for operating the change speed gears.

In the described arrangement, power is transmitted to a lower level directly from the rear end of the engine crank shaft so that a greater drop in the chassis frame is permissible than in the common automobile construction and therefore a lowering of the body is secured which will permit of the dispensing with the use of running boards or steps as the passengers may step directly into the body from the ground, and at the same time leg room and height of seats equal to or greater than that provided in other cars of equal or longer wheel base is secured.

Obviously any suitable means may be provided for transmitting motion from either end of the engine crank shaft downwardly to a lower level and the arrangement of the clutch and transmission mechanisms may be varied from that shown without departing from the spirit of the invention. I do not, therefore, limit myself to the particular construction or arrangement disclosed except as particularly set forth in the appended claims.

Having thus fully described my invention, what I claim is:—

1. In a motor vehicle of the passenger-carrying type, and wherein the power is of internal combustion engine source with the engine crank shaft extending longitudinally of the vehicle, a chassis frame having a portion for the support of an engine and a portion for the support of a passenger-carrying body located in a horizontal plane below the horizontal plane of the engine supporting portion and providing a support for power transmitting instrumentalities for transmitting power from the engine to a driven rear axle differential mechanism, said instrumentalities including a shaft extending longitudinally beneath the body below the horizontal plane of the bottom thereof and said engine crank shaft being positioned with its axis in a horizontal plane above the horizontal plane of the bottom of the body, and means extending from the crank shaft adjacent the rear end of the engine for connecting said crank shaft and said shaft of said instrumentalities to transmit power from the rear end of the crank shaft forwardly of the body and downwardly to said instrumentalities located beneath the body.

2. In a motor vehicle of the passenger-carrying type, and wherein the motor is of internal combustion engine type located adjacent the forward end of the vehicle and having a power shaft extending longitudinally of the vehicle, and wherein the passenger-carrying body is positioned rearwardly of the engine with its bottom in a plane below the plane of said power shaft, a series of power transmitting instrumentalities extending longitudinally of the vehicle below the horizontal plane of the bottom of the body for transmitting power to the rear axle differential mechanism, said power shaft being positioned above said horizontal bottom plane of the body, and means adjacent the engine and forwardly of the forward end of the body forming an operative connection between said power shaft and the power transmitting instrumentality at the forward end of said series.

3. In a motor vehicle of the passenger-carrying type and wherein the motor is of the internal combustion engine type located adjacent the forward end of the vehicle with the engine crank shaft extending longitudinally of the vehicle and wherein the passenger-carrying body is located rearwardly of the engine, and wherein power is transmitted to rear axle differential mechanism by instrumentalities including a clutch, change-speed mechanism and propeller shaft; a chassis frame having a part for the support of the engine and a part for the support of a body and located in a horizontal plane lower than the horizontal plane of said engine supporting part, the engine crank shaft axis being in a horizontal plane above the horizontal plane of the bottom of the body, the several power instrumentalities being supported by and within the horizontal plane of said body supporting part of said frame below the body and laterally of the longitudinal central vertical plane of the frame, and means located forwardly of the body for transmitting motion from the engine crank shaft downwardly and laterally to said instrumentalities.

4. In a motor vehicle as characterized in claim 3 and wherein the means for transmitting motion from the crank shaft to the power transmitting instrumentalities comprises a sprocket wheel on the crank shaft, a shaft arranged in substantial longitudinal axial alignment with said instrumentalities and in the horizontal plane of the body carrying portion of the frame, a sprocket wheel on said shaft, and a sprocket chain engaging said sprocket wheels.

In testimony whereof I affix my signature in presence of two witnesses.

JAMES S. BOOTH.

Witnesses:
P. W. DAVIS,
JEAN M. BOOTH.